US011366801B1

(12) United States Patent
Kumar et al.

(10) Patent No.: US 11,366,801 B1
(45) Date of Patent: Jun. 21, 2022

(54) HIGHLY AVAILABLE STORAGE USING INDEPENDENT DATA STORES

(71) Applicant: Amazon Technologies, Inc., Seattle, WA (US)

(72) Inventors: Ayan Kumar, Kirkland, WA (US); Andrew Evenson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 224 days.

(21) Appl. No.: 16/216,529

(22) Filed: Dec. 11, 2018

(51) Int. Cl.
| G06F 16/00 | (2019.01) |
| G06F 16/23 | (2019.01) |
| G06F 11/20 | (2006.01) |
| G06F 9/54 | (2006.01) |
| G06F 16/2455 | (2019.01) |
| G06F 16/955 | (2019.01) |
| G06F 16/901 | (2019.01) |

(52) U.S. Cl.
CPC .......... *G06F 16/2365* (2019.01); *G06F 9/542* (2013.01); *G06F 11/2025* (2013.01); *G06F 16/2315* (2019.01); *G06F 16/2456* (2019.01); *G06F 16/9014* (2019.01); *G06F 16/955* (2019.01)

(58) Field of Classification Search
CPC .............. G06F 16/182; G06F 11/2028; G06F 16/2471; G06F 16/2365; G06F 16/955; G06F 16/9014; G06F 16/2315; G06F 16/2456; G06F 9/542; G06F 11/2025
See application file for complete search history.

(56) References Cited

U.S. PATENT DOCUMENTS

| 7,428,220 | B1 | 9/2008 | Caronni et al. |
| 7,974,221 | B2 | 7/2011 | Tamassia et al. |
| 7,987,266 | B2 | 7/2011 | Joshi et al. |
| 8,510,304 | B1 | 8/2013 | Briggs et al. |
| 8,661,287 | B2 | 2/2014 | Spear |
| 8,745,012 | B2 * | 6/2014 | Rusher ............. G06F 16/219 707/695 |
| 8,775,817 | B2 | 7/2014 | Ransom et al. |
| 8,924,365 | B2 | 12/2014 | Myers et al. |
| 9,922,056 | B2 | 3/2018 | Hapse et al. |
| 10,089,198 | B1 | 10/2018 | Lu et al. |
| 10,114,909 | B1 | 10/2018 | Evenson et al. |

(Continued)

OTHER PUBLICATIONS

Cardellini et al., "Dynamic Load Balancing on Web-Server Systems", 1999, IEEE. (Year: 1999).*

(Continued)

*Primary Examiner* — Jared M Bibbee
(74) *Attorney, Agent, or Firm* — Robert C. Kowert; Kowert, Hood, Munyon, Rankin & Goetzel, P.C.

(57) ABSTRACT

Methods, systems, and computer-readable media for highly available storage using independent data stores are disclosed. A request to create a data object using an atomic operation is received. A selected data store is determined of a plurality of data stores comprising a first data store and a second data store. The data stores are mutually independent. An identifier assigned to the data object indicates the selected data store. An event associated with creation of the data object is generated. The event is associated with the identifier. The selected data store stores the data object and the event such that the event is consistent with the data object.

20 Claims, 9 Drawing Sheets

(56) References Cited

U.S. PATENT DOCUMENTS

| | | | |
|---|---|---|---|
| 2008/0114787 A1 | 5/2008 | Kashiyama et al. | |
| 2015/0227573 A1* | 8/2015 | Castellano | G06F 16/1756 707/703 |
| 2016/0086260 A1* | 3/2016 | Vermeulen | G06Q 40/00 705/35 |
| 2017/0185625 A1* | 6/2017 | Cheru | G06F 16/217 |
| 2017/0293540 A1* | 10/2017 | Mehta | G06F 11/14 |
| 2019/0147092 A1* | 5/2019 | Pal | G06F 16/90335 707/713 |

OTHER PUBLICATIONS

Wikipedia, "Distributed has table", Retrieved from URL: https://en.wikipedia.org/wiki/Distributed_hash_table on May 8, 2016, pp. 1-9.

"Amazon DynamoDB Developer Guide", Amazon Web Services, API Version Aug. 10, 2012, pp. 1-815.

Wikipedia, "Merkle tree", Retrieved from URL: https://en.wikipedia.org/wiki/Merkle_tree on Apr. 5, 2016, pp. 1-5.

"Performing Conditional Writes with Condition Expression", Amazon DynamoDB, Retrieved from URL: http://docs.aws.amazon.com/amazondynamodb/latest/developerguide/Expressions.SpecifyingConditions.html on May 8, 2016, pp. 1-9.

Sriram Ramabhadran, et al., "Prefix Hash Tree An Indexing Data Structure over Distributed Hash Tables", In the Proceedings of the 23rd ACM Symposium on Principles of Distributed Computing, Jul. 2004, pp. 1-10.

\* cited by examiner

HIGHLY AVAILABLE STORAGE USING INDEPENDENT DATA STORES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. However, as the scale and scope of distributed systems have increased, the tasks of provisioning, administering, and managing the resources have become increasingly complicated.

Web servers backed by distributed systems may provide stores that offer goods and/or services to consumers. For instance, consumers may visit a merchant's website to view and purchase goods and services offered for sale by a set of vendors. Some web-accessible stores include large electronic catalogues of items offered for sale. For each item, such electronic catalogues typically include at least one product detail page that specifies various information about the item, such as a description of the item, one or more pictures of the item, as well as specifications (e.g., weight, dimensions, capabilities) of the item. A distributed system may include many different computing resources and many different services that interact with one another, e.g., to produce a product detail page for consumption by a client of a web server or to process an order placed for such a product.

Figure 1:
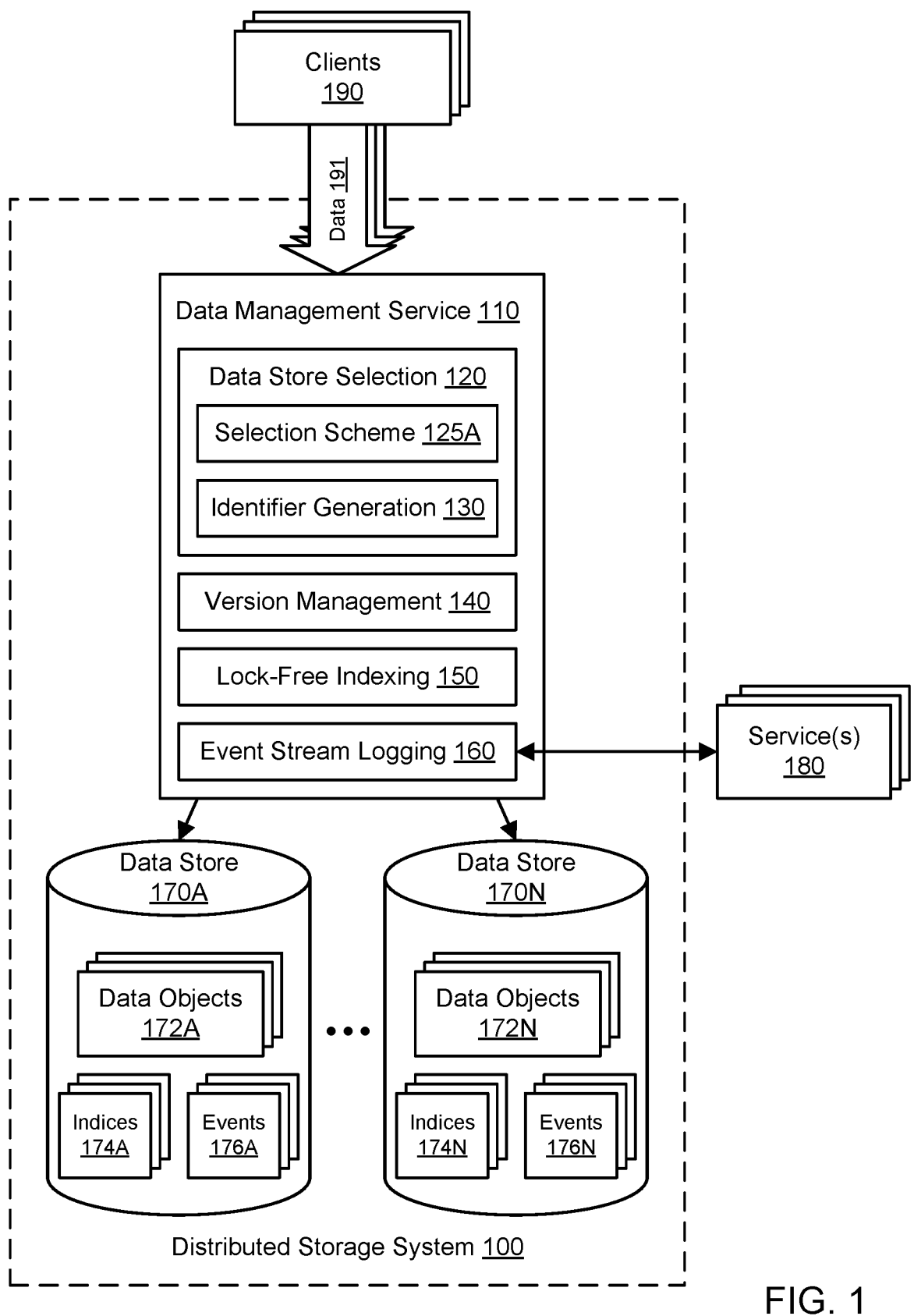
FIG. 1 illustrates an example system environment for highly available storage using independent data stores, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for highly available storage using independent data stores are described. A plurality of data stores may each offer storage in a manner independent of other data stores. Unlike different partitions within the same data store, the independent data stores may use different underlying storage technologies, architectures, and/or resource types to store data. The various data stores may be accessible via different application programming interfaces (APIs). The various data stores may be hosted in the same or different geographical regions. In one embodiment, the data stores may include non-relational key-value data stores that store key-value pairs. In one embodiment, the data stores may include relational data stores. Supported data stores may satisfy a minimal set of requirements, such as offering APIs for getting a value by key, putting a value by key, conditionally putting a value by key, and deleting a key-value pair. Using these APIs, a storage system may perform transactions (e.g., transactions representing the placement or updating of orders to an online store) with guarantees to clients of atomicity, consistency, isolation, and durability.

The storage system described herein may distribute traffic among the independent data stores according to a selection scheme. The selection scheme may assign a particular data store to a particular request. For example, using a selection scheme that evenly distributes traffic among two independent data stores, 50% of requests may be routed to the first data store and the other 50% to the second data store. The selection may be represented in an identifier that is assigned to a data object as well as its index entries, such that the data object and index entries are both stored in the selected data store. Event stream (transaction log) data for the data object may also be stored in the selected data store. The event stream and one or more indices associated with the data object may be immediately consistent with the underlying object. The selection scheme may be modified based on usage or performance metrics. For example, if the latency of request processing exceeds a threshold at the first data store, then a greater percentage of future requests may be routed to the second data store. Due to the independence of the data stores, one data store may remain available if another data store fails. If a first data store becomes inaccessible, then the storage system may route traffic to other data stores until the first data store is brought back online. By adaptively routing traffic among independent data stores, the storage system may offer a very high degree of availability.

As one skilled in the art will appreciate in light of this disclosure, embodiments may be capable of achieving certain technical advantages, including some or all of the following: (1) improving the availability of data storage by selectively routing traffic to one or more available data stores while bypassing a data store that has experienced a total failure; (2) improving the latency of request processing by adaptively routing traffic among independent data stores based (at least in part) on performance metrics such as request processing latency; (3) improving the latency of queries by using immediately consistent indices; (4) improving the use of storage resources by using versioned data storage; (5) improving the accessibility of data by maintaining an event stream indefinitely; and so on.

FIG. 1 illustrates an example system environment for highly available storage using independent data stores, according to some embodiments. A distributed system may include multiple components, such as services or modules, that collaborate to perform complex tasks. As shown in FIG. 1, a distributed system may include a distributed storage system 100 and one or more services 180. The distributed storage system 100 may include a data management service 110 that brokers access to a plurality of independent data stores 170A-170N. The data stores 170A-170N may also represent different services. The distributed system may implement a service-oriented architecture such that multiple services (e.g., services 110 and 180 and data stores 170A-170N) are configured to communicate with each other (e.g., through message passing) to carry out various tasks. For example, the data management service 110 may receive, from clients 190, requests to store data 191. A request may be performed as an atomic operation, e.g., to store a new data object or update an existing data object along with its associated metadata. For a given request, the service 110 may select one of the data stores 170A-170N and interact with the selected data store in order to store a data object and related metadata, such as index entries and/or event stream entries. The data management service 110 may also interact with the additional service(s) 180. For example, data 191 may represent orders placed in an internet-accessible store that offers goods and/or services for sale and/or lease. In such an example, clients 190 may represent end-user devices for customers placing the orders and/or upstream services of the distributed system. In addition to storing the data 191 using the data stores 170A-170N, the data management service 110 may provide the data 191 to the service(s) 180 which may then perform order processing. In one embodiment, the service(s) 180 may pull events associated with the data from the data management service 110.

Using prior solutions, data objects such as orders could be stored in a single data store that represented a single point of failure. By implementing a highly available storage system using a plurality of independent data stores 170A-170N, the distributed storage system 100 may permit orders to an online store to be processed even if one of the data stores 170A-170N fails or otherwise becomes inaccessible. Using the distributed storage system 100, orders or other transactions need not be discarded or delayed in such a failure scenario. If one data store becomes unavailable, then one or more remaining data stores may be write-available for new keys and read-available for older keys that were previously assigned to the remaining data store(s). In one embodiment, the storage system 100 may include a cache that offers a degree of read-availability for objects (potentially outdated versions thereof) assigned to a failed data store.

In some embodiments, the plurality of data stores 170A-170N may use persistent storage resources such as hard disk drives, solid-state drives, and so on. The plurality of data stores 170A-170N may each offer storage in a manner independent of others of the data stores. Unlike different partitions within the same data store, the independent data stores 170A-170N may use different underlying storage technologies, architectures, and/or resource types to store data. The various data stores 170A-170N may be accessible via different application programming interfaces (APIs). For example, data objects may be added to data store 170A via a first set of one or more APIs, and data objects may be added to data store 170N via a second set of one or more APIs that differ in some way from the first set. The different APIs may have different names and/or different functionality. The various data stores 170A-170N may be hosted in the same or different geographical regions. In some embodiments, two or more of the various data stores 170A-170N may be maintained by different business entities or service providers. In some embodiments, two or more of the various data stores 170A-170N may be maintained by different divisions within a single business entity or enterprise.

In one embodiment, any of the data stores 170A-170N may represent a distributed hash table (DHT). In one embodiment, the data stores 170A-170N may include non-relational key-value data stores (e.g., NoSQL stores) that store key-value pairs. In one embodiment, the data stores 170A-170N may include relational data stores. In order to be usable with the service 110, the data stores 170A-170N may satisfy a minimal set of requirements, such as offering APIs for getting a value by key, putting a value by key, conditionally putting a value by key, and deleting a key-value pair. The data stores 170A-170N may differ in their performance characteristics. For example, one data store may represent a hot storage tier with lower latency, while another data store may represent a cold storage tier with higher latency but lower cost and a longer storage window. In such an example, one independent storage tier built on one data store may failover to another independent storage tier built on another data store using the techniques described herein. In one embodiment, one or more of the data stores 170A-170N may represent a hosted data storage solution offering security, speed, availability, reliability, and scalability. In one embodiment, one or more of the data stores 170A-170N may be offered as a storage service available to many clients (internal to an enterprise and/or external to the enterprise). The data stores 170A-170N may scale to handle a very large amount of data, and a fleet of hosts that implement the service 110 may also scale to handle such data.

Each of the services 110 and 180 may be configured to perform one or more functions upon receiving a suitable request. For example, a service may be configured to retrieve input data from one or more storage locations and/or from a service request, transform or otherwise process the data, and generate output data. In some cases, a first service may call a second service, the second service may call a third service to satisfy the request from the first service, and so on. For example, to perform order processing, numerous services may be invoked in a hierarchical manner to implement an ordered workflow to process payment for the order, initiate fulfillment of the order, modify inventory based on the order, and so on. In some embodiments, services may be loosely coupled in order to minimize (or in some cases eliminate) interdependencies among services. This modularity may enable services to be reused in order to build various applications through a process referred to as orchestration. A service may include one or more components that may also participate in the distributed system, e.g., by passing messages to other services or to other components within the same service. A service may offer one or more application programming interfaces (APIs) or other programmatic interfaces through which another service may request the functionality of the service.

The distributed storage system 100 may be configured to process requests from various internal or external systems, such as client computer systems 190 or computer systems consuming networked-based services (e.g., web services). For instance, an end-user operating a web browser on a client computer system 190 may submit an order for one or more products. In another example, another service in the distributed system 100 may submit an order to the data management service 110. The services 110 and 180 may include but are not limited to one or more of network-based services (e.g., a web service), applications, functions, objects, methods (e.g., objected-oriented methods), subroutines, or any other set of computer-executable instructions. In various embodiments, such services may communicate through any of a variety of communication protocols, including but not limited to the Simple Object Access Protocol (SOAP). In various embodiments, messages passed between services may include but are not limited to Extensible Markup Language (XML) messages or messages of any other markup language or format. In various embodiments, descriptions of operations offered by one or more of the services may include Web Service Description Language (WSDL) documents, which may in some cases be provided by a service broker accessible to the services and components. References to services herein may include components within services. In one embodiment, while the various data stores 170A-170N may be accessible via different APIs, the storage service 110 may offer a unified API to clients 190 such that clients are unaware of the underlying data stores 170A-170N and need not format their requests according to the various APIs for the data stores. The unified API of the storage service 110 may differ (at least in part) from the APIs of the independent data stores 170A-170N.

Clients 190 may seek to store data 191 in the storage system 100, and the data management service 100 may broker access by the clients to the independent data stores 170A-170N. To enhance the availability of the storage system 100, the data management service 100 may distribute traffic among the independent data stores 170A-170N based on a selection scheme 125A. The selection scheme 125A may assign a particular data store to a particular data object, e.g., on a request-by-request basis. For example, using a selection scheme 125A that evenly distributes traffic among two independent data stores 170A and 170N, 50% of requests may be routed to the first data store and the other 50% to the second data store. As another example, using a selection scheme 125A that evenly distributes traffic among three independent data stores 170A-170N, 33.3% of requests may be routed to the first data store, another 33.3% of requests to the second data store, and the remaining 33.4% to the third data store. In one embodiment, data objects may be assigned to particular data stores on a random or pseudo-random basis. In one embodiment, some data objects may be assigned to particular data stores based (at least in part) on characteristics of the data objects, the sensitivity or security requirements of the data objects, characteristics of the clients associated with the data objects, or characteristics of the associated requests. For example, a set of requests originating from a particular division within an enterprise may be routed to a particular data store as long as that data store remains available. If the selection scheme 125A represents an even distribution, then a greater percentage of other requests may be assigned to the other data store(s) to offset the requests from the particular division.

As will be discussed in greater detail below, the selection scheme may be changed in order to adapt to conditions in the distributed storage system 100 and maintain high availability of storage for clients 190. For example, the selection scheme 125A may be modified in light of a higher latency of a data store or an unavailability of a data store. The selection scheme may be changed dynamically without taking the service 110 offline or performing a failover from one host to another. In one embodiment, the service 110 may select data stores for objects and route objects to selected data stores without using a static routing table. Once a data store is selected for a data object, that object and its associated metadata may remain with the selected data store despite any changes to the selection scheme. The object may not be moved to another data store. For example, updates to the object may be routed to the previously selected data store, even if the selection was made under a previous selection scheme.

The data store selection 120 may include a component for identifier generation 130. When a request to store data is received by the data management service 110, the service may select a data store for the data object and also generate a data object identifier that reflects the selection of the data store. For example, the data store 170A may be associated with a first alphanumeric string or value and the data store 170N with a second alphanumeric string or value, and a prefix for the generated identifier may include the first alphanumeric string or value or the second alphanumeric string or value. In one embodiment, an identifier (ID) for a data object may be generated using an ID generator based (at least in part) on a knowledge of the selected data store for the object. The identifier may be used to route a data object to the selected data store. The identifier may also be used to route related data or metadata to the selected data store. For example, the service 110 may include a component for lock-free indexing 150 that generates one or more index entries for a data object. The index entries may be associated with the same identifier as the data object and may also be routed to the selected data store. Using the identifier generation 130, a data object and its related data and metadata may consistently be routed to a selected data store. By storing the data object and its index entries in the same data store, retrieval of stored data may be enhanced.

In various embodiments, the data management service 110 may include a variety of components or functionalities that enhance the security of data, the availability of data, the performance of the storage system 100, and so on. In one embodiment, the service 110 may include a component for version management 140. Using the component for version management 140, the service 110 may be used to maintain different versions of a data object. In one embodiment, when a data object is modified, the differences (and not necessarily the entire data object) may be saved and associated with a version number. The service 110 may offer access to a series of revisions of the same underlying data object. The data management service 110 may also offer transactional updating of data objects. From the perspective of clients, transactions by the data management service 110 may offer guarantees of atomicity, consistency, isolation, and durability (ACID). The creation of a new data object in a newly selected data store or the updating of an existing data object in a previously selected data store may be implemented using multiple sub-tasks, but the write may be performed as an atomic operation that entirely succeeds or entirely fails. For example, the sub-tasks may include storing the new object or updated object, storing an event descriptive of the object creation or object update, and storing one or more index entries associated with the object.

The service 110 may create and update data objects based (at least in part) on the data 191. Data objects may be implemented using tree structures. For example, a particular order with multiple items may be represented a tree with the root node representing the order, a first branch representing a first item, and a second branch representing a second item. The first item may have a sub-branch representing one or more product keys, and the second item may have another sub-branch representing another one or more product keys. In one embodiment, a tree may be maintained for each customer, and the tree may include sub-trees for individual orders. In one embodiment, every node in the tree may be stored using a separate file in one of the data stores 170A-170N.

As discussed above, the service 110 may include a component for lock-free indexing 150. The lock-free indexing may create and maintain the tree structures discussed above. The lock-free indexing 150 may maintain indices for data objects that do not require locks in order to access the indices. The resulting indices may be immediately consistent with the related data objects. In one embodiment, if an order by a customer is created or modified, then a customer index may be immediately updated to reflect the order. One or more lock-free indices may be associated with the same identifier as the related data object and may also be stored in the same data store as the data object. As shown in FIG. 1, data store 170A may store a set of data objects 172A along with a set of related indices 174A. Similarly, data store 170N may store a set of data objects 172N along with a set of related indices 174N.

In one embodiment, the service 110 may include a component for event stream logging 160. The event stream logging 160 may persistently maintain streams of events associated with data objects and/or client accounts. Entries in an event stream may be timestamped or otherwise ordered by time. The event stream may represent a queue or other first-in-first-out (FIFO) data structure. The event stream may store a sequence of events for the creation and subsequent modification of a particular data object. For example, if the data object represents an order, then the event stream for the object may represent the order as placed, an update to the order to remove an item, an update to the order to change the shipping address for the item, an update to the order to change the quantity of an item, and so on. The event streams may be stored in the data stores 170A-170N, e.g., based on the same per-object identifiers for co-location of event streams with related data objects in the same data store. As shown in FIG. 1, data store 170A may store a set of data objects 172A along with a sequence of related events 176A. Similarly, data store 170N may store a set of data objects 172N along with a sequence of related events 176N.

The event stream may be modified before storing the modification to the data object in the data store, and the resulting event stream may be immediately consistent with the related data objects. To enhance the use of the storage resources of the data stores, the event stream may store references to different revisions of the object rather than the objects themselves. In one embodiment, an event stream may be maintained indefinitely. The event stream may offer a completeness guarantee where every modification to an object is represented such that the sequence of events may be used for accounting purposes. In one embodiment, all or part of an event stream may be deleted, e.g., to protect customer privacy or comply with applicable laws or regulations. The event stream may be used to perform rollbacks for particular data objects.

The event streaming 160 may also provide events to one or more external services 180. The service(s) 180 may pull events from the event streaming 160. For example, if a data object represents an order placed at an online store, then an event associated with that object (e.g., a newly placed order) may be obtained from the event streaming 160 by one or more services 180 that perform further order processing. For example, the service(s) 180 may implement an ordered workflow to process payment for the order, initiate fulfillment of the order, modify inventory based on the order, and so on.

Figure 9:
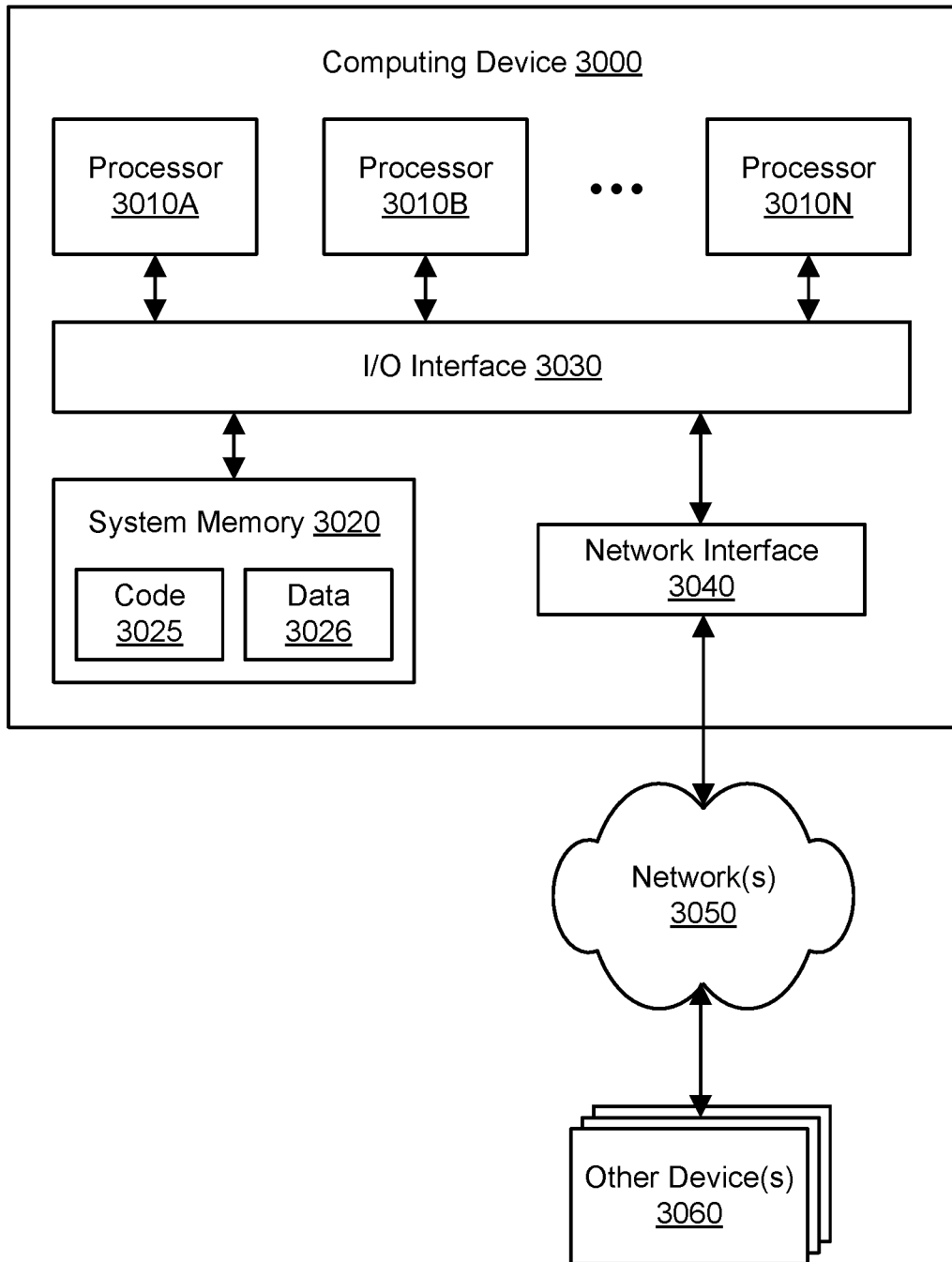
FIG. 9 illustrates an example computing device that may be used in some embodiments.

The distributed storage system 100 may include one or more computing devices, any of which may be implemented by the example computing device 3000 illustrated in FIG. 9. In various embodiments, the functionality of the different services, components, and/or modules of the distributed storage system 100 may be provided by the same computing device or by different computing devices. If any of the various components are implemented using different computing devices, then the respective computing devices may be communicatively coupled, e.g., via a network. Each of the components of the distributed storage system 100 may represent any combination of software and hardware usable to perform their respective functions, as discussed as follows. Functions implemented by the distributed storage system 100, such as the various components 120, 140, 150, and 160 of the service 110, may be performed automatically, e.g., without a need for user initiation or user intervention after an initial configuration stage, and programmatically, e.g., by execution of program instructions on at least one computing device. In one embodiment, aspects of the distributed storage system 100, such as the data store selection 120, may be performed repeatedly over time. The distributed storage system 100 may include additional components not shown, fewer components than shown, or different combinations, configurations, or quantities of the components shown.

A service in the distributed system 100 may be implemented using a plurality of different instances that are distributed throughout one or more networks, and each instance may offer access to the functionality of the corresponding service to various clients, including other services. Any of the services 110 and 180 may represent one or more service instances. Any of the services 110 and 180 may be implemented using one host or a plurality of hosts, any of which may be implemented by the example computing device 3000 illustrated in FIG. 9. Similarly, any of the data stores 170A-170N may represent one or more service instances and may be implemented using one host or a plurality of hosts, any of which may be implemented by the example computing device 3000 illustrated in FIG. 9. The hosts may be located in any suitable number of data centers or geographical locations. In one embodiment, multiple services and/or instances of the same service may be implemented using the same host.

It is contemplated that any suitable number and configuration of clients 190 may interact with the services of the distributed storage system 100. Services of the distributed system may convey network-based service requests to one another via one or more networks. In various embodiments, the network(s) may encompass any suitable combination of networking hardware and protocols necessary to establish network-based communications between two services. For example, the network(s) may generally encompass the various telecommunications networks and service providers that collectively implement the Internet. The network(s) may also include private networks such as local area networks (LANs) or wide area networks (WANs) as well as public or private wireless networks. For example, different services such as services 110 and 180, or different data stores 170A-170N, may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between a first service and the Internet as well as between the Internet and a second service. In some embodiments, services may communicate with one another using a private network rather than the public Internet.

In one embodiment, aspects of the distributed system may be implemented using computing resources of a provider network. A provider network may represent a network set up by an entity such as a company or a public-sector organization to provide one or more services (such as various types of network-accessible computing or storage) accessible via the Internet and/or other networks to a distributed set of clients. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like. Because resources of the provider network may be under the control of multiple clients (or tenants) simultaneously, the provider network may be said to offer multi-tenancy and may be termed a multi-tenant provider network.

Figure 2:
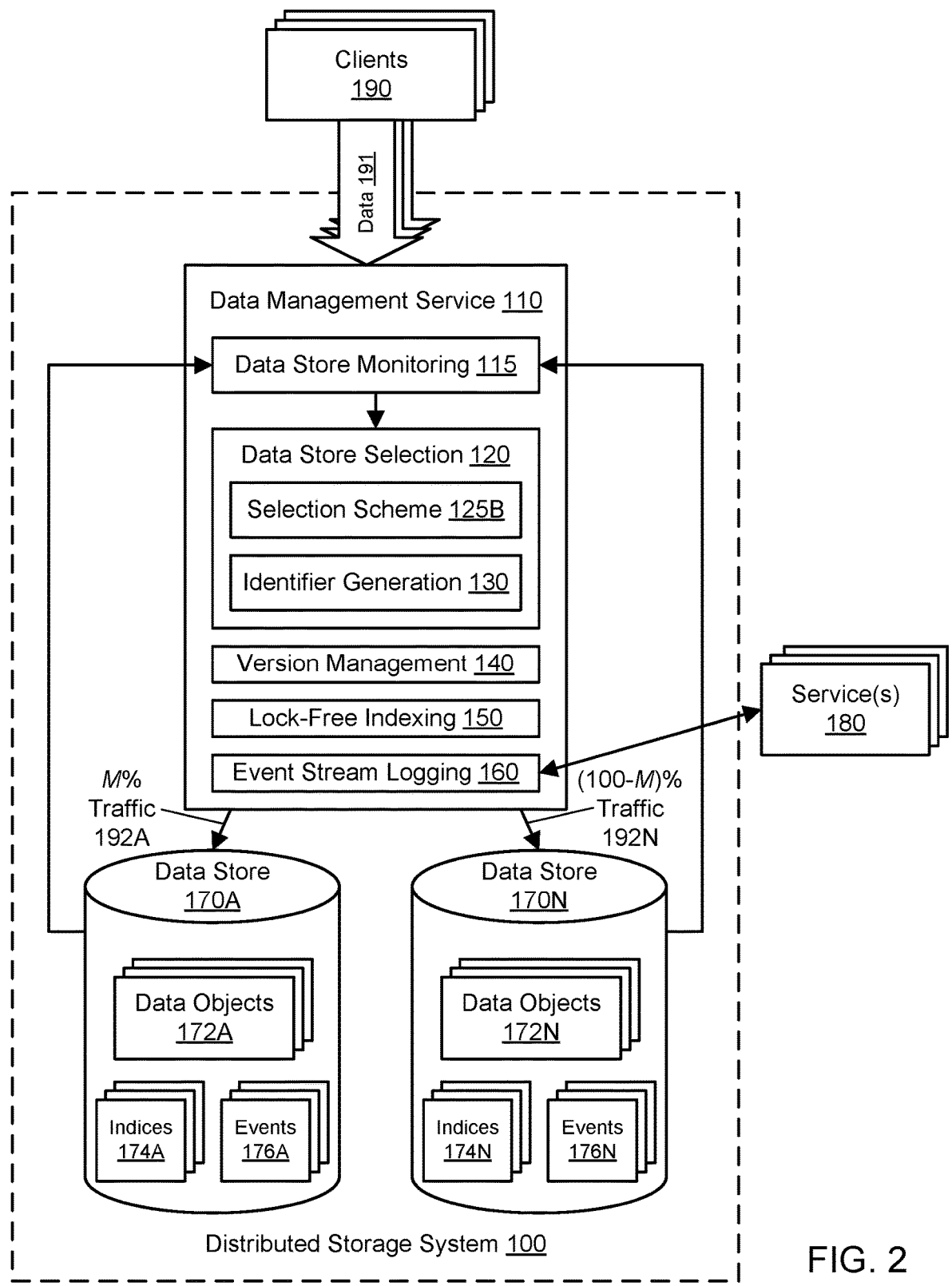
FIG. 2 illustrates further aspects of the example system environment for highly available storage using independent data stores, including a change in traffic distribution among the independent data stores, according to one embodiment.

FIG. 2 illustrates further aspects of the example system environment for highly available storage using independent data stores, including a change in traffic distribution among the independent data stores, according to one embodiment. As discussed above, the data management service 110 may distribute data objects among a plurality of independent data stores 170A-170N according to a selection scheme. In some embodiments, the selection scheme may be modified to adapt to changing conditions in the storage system 100. The conditions of the storage system 100 may be ascertained by the service 110 using a component for data store monitoring 115. The data store monitoring 115 may determine the health of individual data stores 170A-170N. The data store monitoring 115 may determine one or more usage metrics or performance metrics for individual data stores 170A-170N. For example, the data store monitoring 115 may determine that a particular data store currently has a latency of processing storage requests that exceeds a predetermined threshold latency value. In one embodiment, the selection scheme may be modified based on such metrics to produce a new selection scheme 125B. For example, if the latency of request processing exceeds a threshold at the data store 170A, then a greater percentage of future requests may be routed to the data store 170N.

In the example of FIG. 2, the storage system 100 includes two data stores 170A and 170N. In the illustrated example, the percentage of traffic 192A routed to data store 170A may be changed from 50% to M % based (at least in part) on the monitoring 115. The remainder 192N of the traffic ((100–M) %) may be routed to the other data store 170N. M may represent a number greater than 50 (e.g., if the data store 170A can process more traffic than the data store 170N) or a number less than 50 (e.g., if the data store 170A can process less traffic than the data store 170N). The selection scheme 125B may be changed again as new conditions are detected in the storage system 100. By adapting the selection scheme to changing conditions in the storage system 100, the data management service 110 may offer improved availability for storage of data 191 across a plurality of independent data stores 170A-170N.

Figure 3:
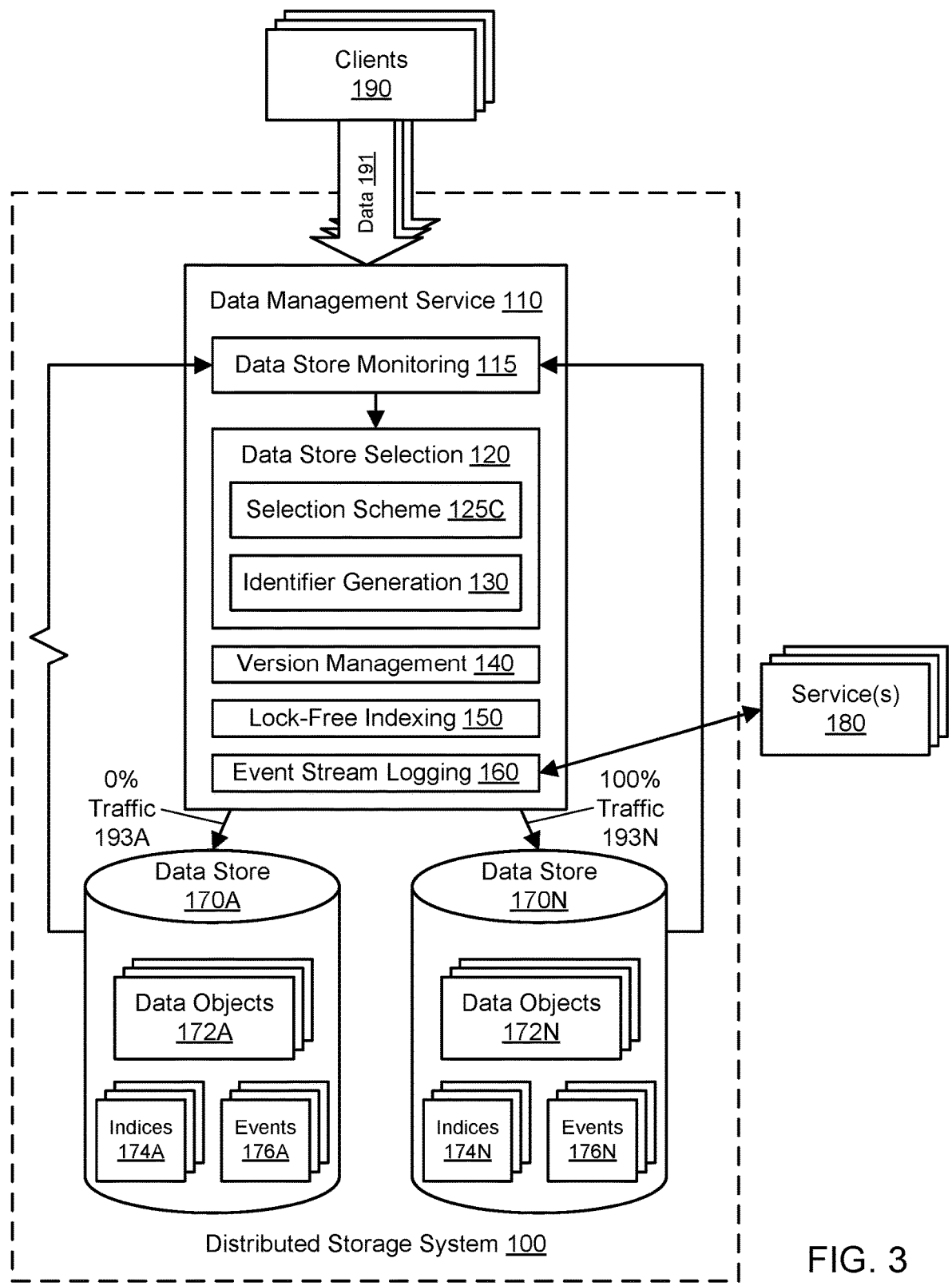
FIG. 3 illustrates further aspects of the example system environment for highly available storage using independent data stores, including a redirection of traffic to one data store when another data store is unavailable, according to one embodiment.

FIG. 3 illustrates further aspects of the example system environment for highly available storage using independent data stores, including a redirection of traffic to one data store when another data store is unavailable, according to one embodiment. As discussed above, the data store monitoring 115 may determine the health of individual data stores 170A-170N. In one embodiment, the data store monitoring 115 may determine that a data store 170A has become inaccessible for new writes. The inaccessibility may result from a total failure of the data store 170A or a failure of one or more of its components. The data store monitoring 115 may automatically detect the failure based (at least in part) on a lack of acknowledgements of requests sent to the failed data store 170A. The data store monitoring 115 may automatically detect the failure based (at least in part) on an interruption in a "heartbeat" connection from the failed data store 170A. In one embodiment, the data store monitoring 115 may be informed of the current or anticipated inaccessibility of the data store based (at least in part) on user input (e.g., from an administrator of the storage system 100). For example, if the data store 170A is to be taken offline for maintenance, then an administrator may input the planned outage so that the data store selection 120 can account for the inaccessibility of the data store 170A. The inaccessibility of the data store 170A may be represented in a modified selection scheme 125C. The modified selection scheme 125C may bypass the inaccessible data store 170A until the data store is brought back online and the selection scheme is changed again.

In the example of FIG. 3, the storage system 100 includes two data stores 170A and 170N. Due to the independence of the data stores, one data store may remain available if the other data store fails. In the illustrated example, the percentage of traffic 193A routed to data store 170A may be changed to 0%, e.g., based (at least in part) on a detection of inaccessibility of the store using the monitoring 115. In the illustrated example, 100% of the traffic 193N may then be routed to the other data store 170N. In another example, a plurality of additional data stores may remain online, and the traffic may be evenly distributed among those additional data stores and routed away from the failed data store. The selection scheme 125C may be changed again as new conditions are detected in the storage system 100, e.g., when the data store 170A again becomes accessible for writes. By adapting the selection scheme to bypass outages in the storage system 100, the data management service 110 may continue to offer high availability for storage of data 191 even if one or more data stores experience failure. Data objects assigned to data stores under one selection scheme may remain with the selected data stores even if the selection scheme is changed.

Figure 4:
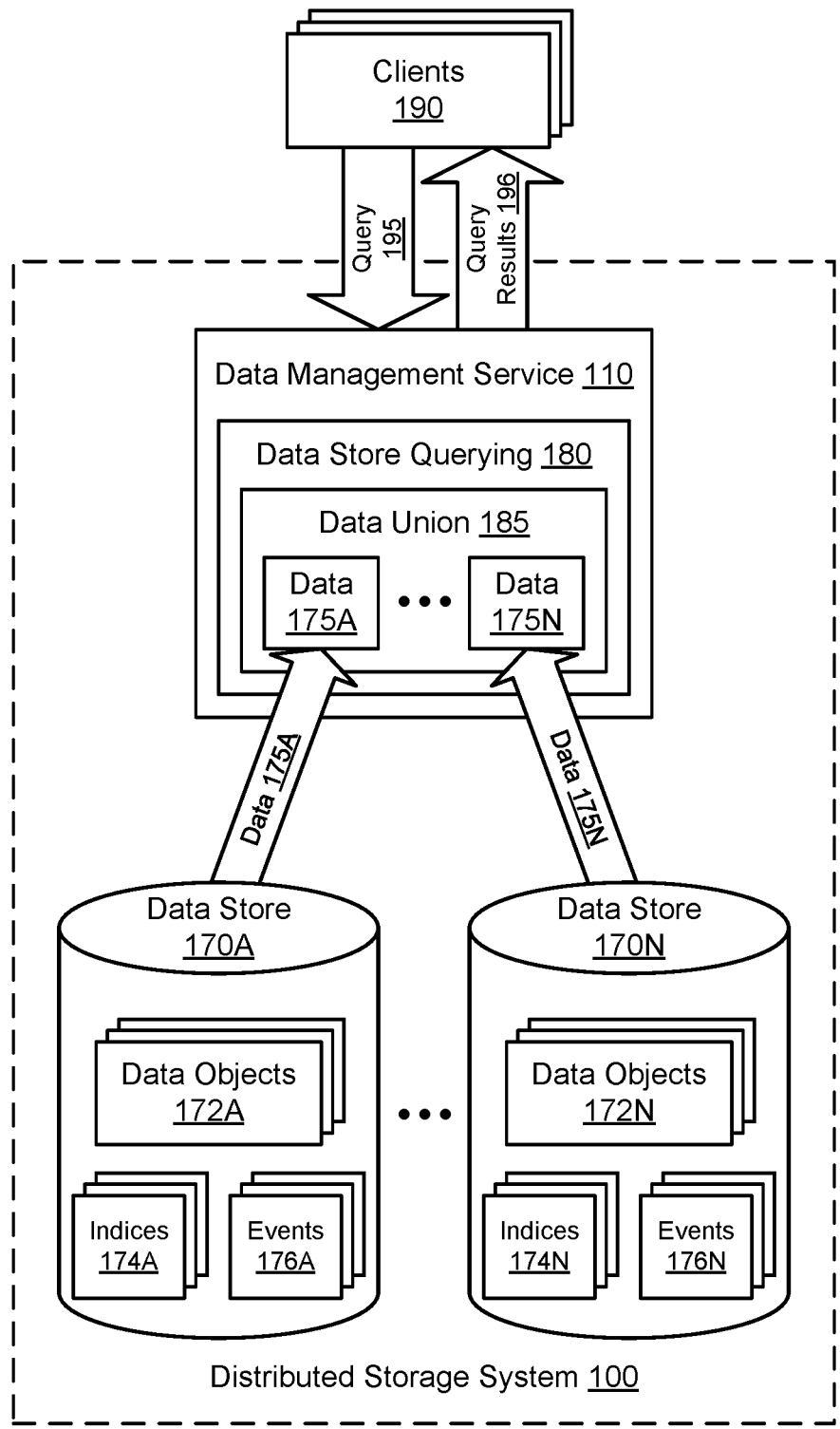
FIG. 4 illustrates further aspects of the example system environment for highly available storage using independent data stores, including a query that represents a union of results from multiple independent data stores, according to one embodiment.

FIG. 4 illustrates further aspects of the example system environment for highly available storage using independent data stores, including a query that represents a union of results from multiple independent data stores, according to one embodiment. In one embodiment, data objects associated with the same account or entity may be distributed across the plurality of data stores 170A-170N. For example, different orders placed by the same customer may be stored (along with index entries and other related metadata) in both the data store 170A and the data store 170N. A client may submit a query 195 to the data management service 110, and under some circumstances, the query 195 may seek data from two or more of the data stores 170A-170N. For example, the query 195 may seek data (such as order data) associated with a particular customer, account, or other entity, where the desired data is not limited to one data store.

To perform the query 195, the data management service 110 may include a component for data store querying 180. The query component 180 may direct queries to individual data stores such as data store 170A and data store 170N. The data store 170A may respond with data 175A (e.g., a subset of the data objects 172A), and the data store 170N may respond with data 175N (e.g., a subset of the data objects 172N). The query component 180 may perform a union 185 of the individual results 175A-175N. For example, data 175A may represent one or more orders placed by a particular customer that satisfy query criteria, data 175N may represent another set of one or more orders placed by the customer that satisfy the query criteria, and the union 185 may represent all of the customer's orders that satisfy the query criteria. The union 185 may be reported back to the client who submitted the query as query results 196. By performing the data union 185, the data management service 110 may generate a unified view of multiple independent data stores 170A-170N.

Figure 5:
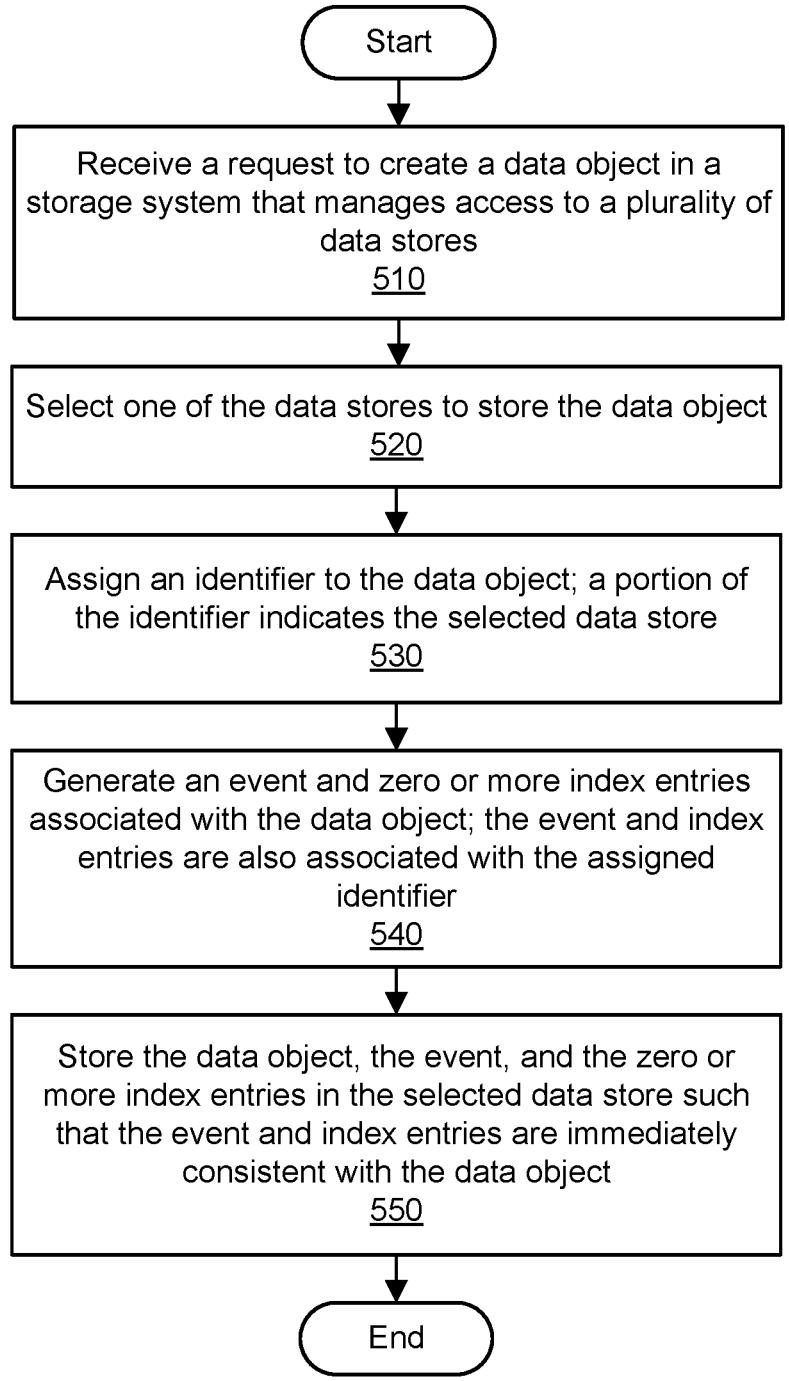
FIG. 5 is a flowchart illustrating a method for highly available storage using independent data stores, according to one embodiment.

FIG. 5 is a flowchart illustrating a method for highly available storage using independent data stores, according to one embodiment. As shown in 510, a request to create a new data object may be received at a distributed storage system that manages access to a plurality of data stores. For example, the data object may represent an order placed by a customer of an online store that offers one or more catalogues of goods and/or services. The plurality of data stores may offer persistent storage of data objects and related data and metadata using storage resources such as hard disk drives, solid-state drives, and so on. The plurality of data stores may each offer storage in a manner independent of others of the data stores, such that one data store may remain available for writes if another data store fails or becomes inaccessible. Unlike different partitions within the same data store, the independent data stores may use different underlying storage technologies, architectures, and/or resource types to store data. The various data stores may be accessible via different application programming interfaces (APIs). For example, data objects may be added to one data store via a first set of one or more APIs, and data objects may be added to another data store via a second set of one or more APIs that differ in some way from the first set. The different APIs may have different names and/or different functionality. The various data stores may be hosted in the same or different geographical regions. In one embodiment, the data stores may include non-relational key-value data stores that store key-value pairs.

As shown in 520, one of the data stores may be selected to store the data object. To enhance the availability of the storage resources, the storage system may distribute traffic among the independent data stores based on a selection scheme. The selection scheme may assign a particular data store to a particular data object, e.g., on a request-by-request basis. For example, using a selection scheme that evenly distributes traffic among two independent data stores, 50% of requests may be routed to the first data store and the other 50% to the second data store. As another example, using a selection scheme that evenly distributes traffic among three independent data stores, 33.3% of requests may be routed to the first data store, another 33.3% of requests to the second data store, and the remaining 33.4% to the third data store. In one embodiment, data objects may be assigned to particular data stores on a random or pseudo-random basis. In one embodiment, some data objects may be assigned to particular data stores based (at least in part) on characteristics of the data objects, the clients, or the associated requests. The selection scheme may be determined based (at least in part) on conditions in the distributed storage system in order to maintain high availability of storage for clients. For example, the selection scheme may be modified in light of a higher latency of a data store to lessen the amount of traffic directed to that data store, or the selection scheme may be modified in light of an unavailability of a data store to bypass that data store and essentially exclude it from potential selection.

As shown in 530, an identifier may be assigned to the data object. The identifier may be generated such that a portion of the identifier indicates the selected data store. For example, the selected data store may be associated with an alphanumeric string or value, and a prefix for the generated identifier may include that alphanumeric string or value. The identifier may be used to route the data object to the selected data store. If the storage system receives a request to modify a data object and not create the object, the method may skip the operation shown in 530 and instead use the identifier previously generated for the object upon its creation.

As shown in 540, an event and zero or more index entries may be generated that are associated with the data object. The event and index entries (if any) may also be associated with the same identifier as the related data object. The event may be part of an event stream associated with the object that indicates a sequence of creation and (optionally) subsequent modifications. For example, the event associated with the request shown in 510 may indicate the creation of a data object. An index associated with the data object may permit reverse lookups for primary objects. If index entries are created, one or more index entries may be associated with a secondary index that references various data objects (e.g., orders) associated with a particular customer.

As shown in 550, the data object, the event, and the zero or more index entries may be stored in the selected data store. The data store may provide persistent storage for data objects and related data and metadata. The data object, the event, and the zero or more index entries may be co-located in the same data store based (at least in part) on the common identifier that indicates the data store. By storing the data object and related data and metadata in the same data store, the distributed storage system may improve the latency of data reads.

A request to create or update a data object may represent a request for a transactional update to a data store. From the perspective of clients, transactions by the data management service may offer guarantees of atomicity, consistency, isolation, and durability (ACID). The creation of a new data object in a newly selected data store or the updating of an existing data object in a previously selected data store may be implemented using multiple sub-tasks, but the write may be performed as an atomic operation that entirely succeeds or entirely fails. For example, the sub-tasks may include storing the new object or updated object, storing an event descriptive of the object creation or object update, and storing one or more index entries associated with the object.

As an example of index usage, a particular order may be associated with a customer ID and two tracking numbers from two shippers for two different shipments associated with the order. The customer ID and tracking numbers may be stored in the data store as a primary object, and a head pointer may point to the current version of the object. When the primary object is created, a packages index (implemented as a tree) for the customer ID may include nodes for the tracking numbers, and those nodes may indicate the order identifier. When the storage system receives a request to list the purchases for a particular tracking number, the system may find the order identifier for the tracking number in the packages index and then retrieve the data for the order using the head pointer for the order identifier that points to the primary object. An index may include a minimal amount of data and may be used as a lookup to a primary object (e.g., representing an order) that stores a more complete set of data.

Manifest Data Indicating Revisions

Figure 6:
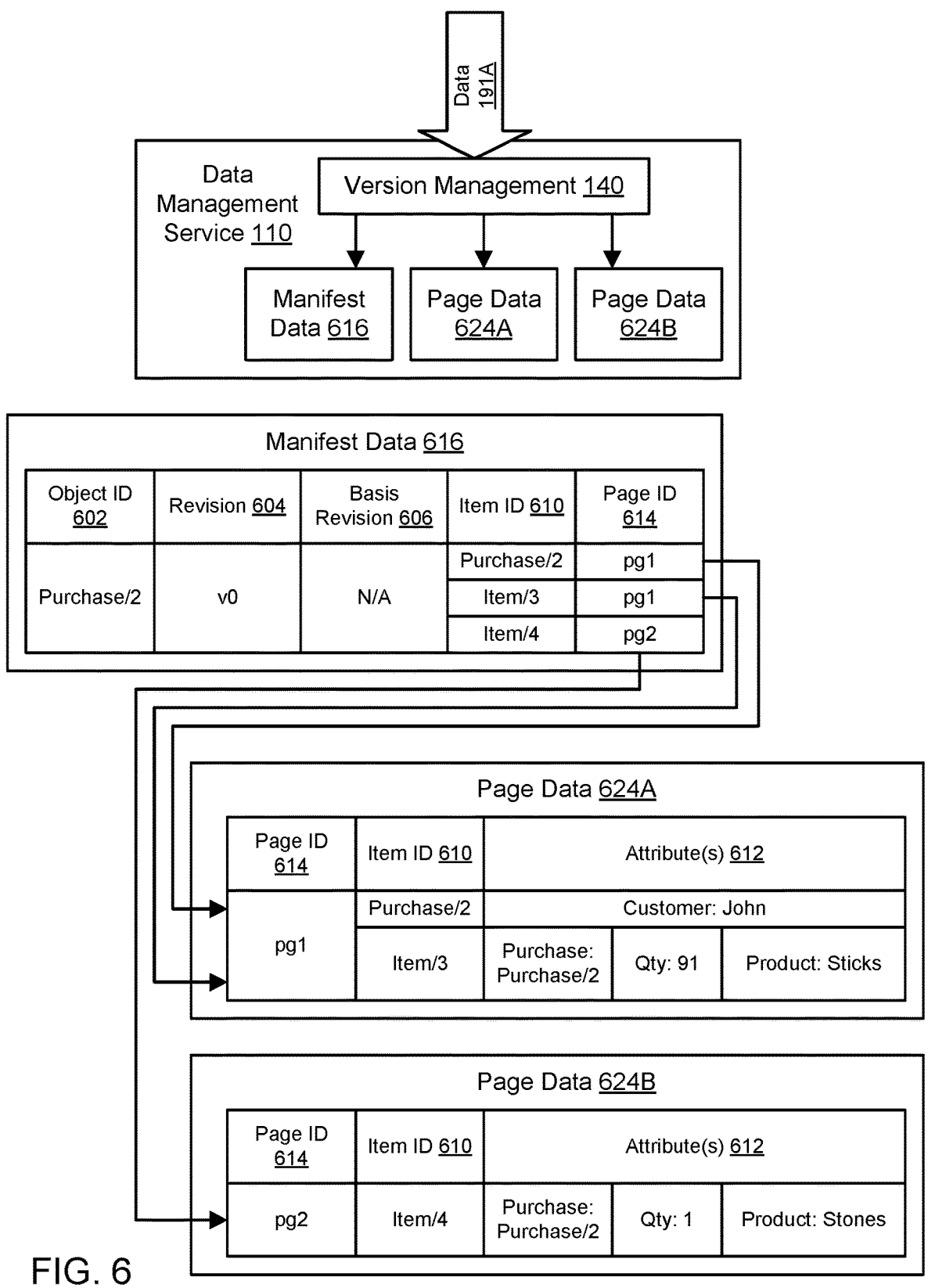
FIG. 6 illustrates further aspects of the example system environment for highly available storage using independent data stores, including generation of manifest data and page data using the version management component, according to one embodiment.

FIG. 6 illustrates further aspects of the example system environment for highly available storage using independent data stores, including generation of manifest data and page data using the version management component, according to one embodiment. The storage system 100 discussed herein may store information in one or more distributed hash table (DHT) systems. A DHT system may represent a decentralized distributed system that provides a lookup service similar to a hash table which uses a data structure that maps keys to values. The DHT system may comprise one or more storage nodes that operatively connected to one another. A storage node may comprise a computing device such as a server. The one or more nodes may be configured to store and retrieve data. The DHT system may be configured to store data as read-only or fixed data. The DHT system may be configured to store non-relational tables based on a non-relational model. Clients of the storage system 100 may generate object data. The object data may represent an assortment of related information. In one example, the system enables e-commerce transactions such that a user of the client device may purchase goods. The object data may comprise information about the transaction such as identification information of the user, identification information of the products ordered, information indicating the amount of products ordered, and so forth. The object data may include, among other information, one or more items. An item may include an item identification (ID) and one or more attributes that are associated with the item ID. The attributes may comprise byte arrays and may be representative of various data such as information about a user associated with a purchase, information about which products have been ordered, information about how many products have been ordered, shipment history, and so forth.

A client device may provide object data to the storage system 100 for processing. The storage system 100 may process the object data such that the items of the object data are stored across one or more memory locations of one or more of the nodes of a selected data store (e.g., a DHT system). In one embodiment, a DHT system may be configured to store billions of different items across the nodes of the DHT system. A memory location may comprise one or more memory address spaces. The DHT system may store an object having a relatively large amount of items in a single node or across more than one node. As objects continue to grow in size, locating, retrieving, and updating a desired group of items across the DHT system may become difficult. For example, the DHT system may store billions of items, and a particular object may include one thousand items which may need an update. Looking up each of the thousand items for updating from a pool of billions of items may be relatively time-consuming. The distributed storage system 100 described herein may be configured to store the items as read-only or fixed data. Accordingly, when an object is updated, the DHT system may not perform the time-consuming process of looking up each of the items for an update process. Rather, the new information may be stored in a different memory location.

The data management service 110 may generate page data. The page data may comprise a file including one or more items. The page data may be associated with a page ID which identifies the page data. For example, first page data may include or be associated with page ID "pg1", and second page data may include or be associated with page ID "pg2". As discussed in more detail below, the data management system may generate different page data for different items of an object. The data management system may also generate manifest data. The manifest data may comprise information used to find certain items stored in the DHT system. In some embodiments, the manifest data includes the item IDs and page IDs that are associated with the item IDs. The manifest data may be persistently stored in the selected data store.

FIG. 6 depicts an example of the generation of the manifest data 616 and page data 624A and 624B. As shown in FIG. 6, the manifest data 616 may be associated with the page data 624A and 624B. The data management service 110 may generate the manifest data 616 and page data 624A and 624B using a data object 191A. The data object 191A may include information such as an object ID "Purchase/2" which represents an identification of the object data 191A and a revision identifier "v0" which identifies the version of the object data 191A. Because the object data 191A depicted in the example of FIG. 6 is not generated based on a previously-generated revision, there is no basis revision associated with the object. The basis revision may be depicted such that "N/A" is included in the field designated for the basis revision. In other examples, the basis revision may include data that indicates that the object data is generated based on previously-generated object data. The data object 191A may include three items depicted as three rows. The first item may include: 1) the attribute "Customer: John"; and 2) the item ID "Purchase/2" which is associated with the attribute. The second item may include: 1) second attributes "Qty: 91" and "Product: sticks"; and 2) the item ID "Item/3" which is associated with the second attributes. The third item may include: 1) third attributes "Qty: 1" and "Product: stones"; and 2) the item ID "Item/4" which is associated with the third attributes. The third item indicates that the user 102 placed an order for 1 stone. Once the object 191A is received by the data management service 110, the service may generates manifest data 616 and page data 624A and 624B for the received object data 191A.

The manifest data 616 may include the object ID 602 "Purchase/2" and the revision 604 "v0" which identifies the version of the object data 191A. In this example, the manifest key may comprise "Purchase/2:v0". The manifest data 616 may indicate that the basis revision 606 is not applicable (N/A). The manifest data 616 may includes item IDs 610 which are associated with page IDs 614. The page IDs 614 may represent identifications which are used to locate items stored in the page data 624A and 624B. In this example, the manifest data 616 includes: 1) the item ID 610 "Purchase/2" and page ID 614 "pg1" which is associated with the item ID 610 "Purchase/2"; 2) the item ID 610 "Item/3" and the page ID 614 "pg1" which is associated with the item ID 610 "Item/3"; and 3) the item ID 610 "Item/4" and the page ID 614 "pg2" which is associated with the item ID 610 "Item/4".

As shown in FIG. 6, the items of the object data 191A may be segregated in the page data 624A and page data 624B. The determination of which items are stored at which page data may be determined based on a variety of factors. In one example, the factors include the type of key-value stores being implemented by the selected data store or a determination of the costs associated with storing items in one or more memory locations. Certain types of key-value stores may have certain limitations such as memory capacity limitations. The depicted page data 624A and 624B may be stored in one or more storage nodes in the selected data store. For example, a single node may store the page data 624A and 624B, or the page data 624A may be stored in a first node and the page data 624B may be stored in a second node. The page data 624A may includes the page ID 614 "pg1" which is an identification of the page data 624A. The association of the page ID 614 with the page data and the association of the item IDs 610 with the page data are used by the storage system 100 to locate the items stored by the page data. For example, if a client requests the item which has an item ID 610 of "Item/4", the data management service 110 may query the manifest data 616 for the item ID 610 which includes "Item/4" and determine that the item that includes this item ID 610 is located at the page data 624B which has a page ID 614 of "pg2".

The page data 624A may include two of the three items of the object data 612. The page data 624A may include the first item which includes the item ID 610 "Purchase/2" and the associated attribute 612 "Customer: John". The page data 624A may also include the item ID 610 "Item/3" and the following associated attributes 612: "Purchase: Purchase/2", "Qty: 91"; and "Product: sticks". The page data 624B may include page ID 614 "pg2" and the following associated attributes 612: "Purchase: Purchase/2", "Qty: 1"; and "Product: stones".

Immediately Consistent Lock-Free Indexing and Event Stream Updating

As discussed above, the data management service 110 may perform lock-free indexing 150. A scalable lock-free algorithm for updating indexes that provides immediate consistency (as opposed to the eventual consistency which may be supported in some storage environments) may be implemented. An event stream updating algorithm may be implemented in a similar manner to provide immediate consistency of events in an event log. According to the indexing algorithm, in response to determining that an entry for a given list key (with an associated hash key) is to be inserted into an index, an index handler may first identify the particular tree-based index corresponding to the hash key. Then, based on the child node references (or list key contents) contained in the index nodes starting from the root node, a path to a candidate destination node for the new list key's entry may be identified and traversed. Depending on the current contents of the candidate destination node and the value of the to-be-inserted list key, the index handler may identify the contents of a critical write operation which must be completed before the insertion can be considered complete. In addition, one or more non-critical writes may also be identified; these writes may be performed asynchronously with respect to the critical write, or may even be deferred and left to other index handlers.

If the addition of the new entry to the candidate destination node would result in a split criterion being met (where the split criteria may differ for different levels or node depths within the index), one or more deferred split descriptors may be generated in some embodiments. The number of deferred split descriptors may also differ depending on the depth of the candidate destination node within the index in some embodiments—e.g., in the case of a root node, two deferred split descriptors may be generated, while in the case of a non-root node, only one deferred split descriptor may be created. A given deferred split descriptor may include a newly-created node identifier and a group of one or more list key entries which are to be included in a to-be-split node. The deferred split descriptor may be embedded within the candidate destination node, and the modified version of the candidate destination node may be written back to the data store as the critical write. The new list key may, depending on its value, either fall within the range of list keys associated with the to-be-split node, or may be included in the range of list keys which are going to remain with the candidate destination node after the deferred split is actually performed. The actual split operation resulting in the creation of a new node with the node identifier indicated in the deferred split descriptor may eventually be performed, e.g., as a critical or non-critical write associated with some other index update operation, later by the same index handler or a different index handler. Thus, even though the split criterion for a node may be met as a result of the insert, the actual split may be deferred till later in at least some embodiments. Of course, if a split criterion would not be met as a result of adding the entry for the new list key, a modified version of the candidate destination node with the new list key added may form the critical write. No locks may be acquired for either the critical write or any of the non-critical (deferred) writes performed by an index handler in various embodiments. In some embodiments, the back-end data store may not even support write locks of the kind typically supported by relational databases.

An insert may be deemed successful (and a corresponding insert-completed response may be provided to the requesting client) as soon as the critical write of the candidate destination node is completed (e.g., as a result of a conditional write request issued by the index handler to the back-end data store). The index may be deemed immediately consistent because at any given time, for any given list key for which a corresponding base data object has been stored, exactly one node containing the entry for the key may be found at the back-end data store (e.g., one of the selected data stores 170A-170N). It is noted that although the index management algorithms are described primarily in the context of data objects which are identified using a compound key (with a hash key and a list key) in the remainder of this document, the algorithms may be employed with equal success in embodiments in which other types of keys, which do not necessarily have distinct hash and list key components, are used.

The lock-free indexing 150 may be employed for data objects which are identified by a combination of a hash key and a list key in at least some embodiments. For example, in a distributed order management system for an Internet-based retailer, a unique hash key may be generated for each customer, and each order generated for a given customer may be assigned its own list key (e.g., unique at least within the scope of the customer's order set). According to at least one embodiment, a respective tree-based or tree-structured index (e.g., based on a variant of a B-tree or B+-tree) may be generated for each hash key. A leaf node of the index may comprise respective entries for some number of list keys (and in some cases, deferred split descriptors as discussed below), while non-leaf nodes may comprise pointers or references to their child nodes (and also in some cases, deferred split descriptors). Such tree-based indexes may be referred to herein as list key indexes. In some embodiments, the entries within a leaf node may be arranged in a selected sort order (such as dictionary order) with respect to the list keys.

Each node of the index may be persisted at one or more storage servers of the selected data store (e.g., a non-relational key-value based database system which may not natively support locking or transactions) in at least some embodiments. In addition to accommodating the index nodes, the selected data store may also serve as the persistent repository of the content of data objects which are being indexed (e.g., the details of various customer orders in the above example). In at least some embodiments, the back-end data store may support conditional write operations. With respect to the algorithms discussed herein, a conditional write may be defined as a write that succeeds only if one or more attributes of the object being written meet respective expected conditions at the time that the write is attempted. For example, a conditional write to update a value of an attribute Attr1 of a data object Obj1 may indicate an expected pre-write value of Attr1, with the write being expressed as the logical equivalent of "If the current value of Obj1.Attr1 with key K1 is 10, set Obj1.Attr1 to 20". In this example, if Obj1.Attr1's value is not 10, the conditional write may be designated as having failed due to a violation of an expected condition. Another example of a conditional write may be expressed as the logical equivalent of "create object Obj2 with key value K2 if an object with that key doesn't already exist", which may be used for generating new objects. Conditional writes may also be considered analogous to "compare and swap" operations at a data object level. In at least some embodiments, the state of the object to be modified may be read, and the condition that has to be met for the conditional write may be that the object's state has not changed since the object was read.

The indexing algorithm may comprise a plurality of index operation handlers in various embodiments, collectively responsible for handling insert updates, deletes, read queries, and the like from a potentially large set of clients concurrently. Each index operation handler may for example comprise one or more threads of execution at one or more computing devices in some implementations. Index operation handlers may also be referred to herein simply as index handlers.

The index handlers may defer at least some split operations (as well as other types of operations under certain conditions) to ensure immediate consistency without using locks, while also reducing insert latency in various embodiments. To defer a split of an index node, a "deferred split descriptor" containing an identifier of a to-be-split node and one or more key entries that may be included in the to-be-split node may be embedded within an existing node of the index, and the existing node may be written to the data store as described below. The "actual" split of the node may be performed in a separate write operation later (which may sometimes be performed by a different index handler than the one which embedded the deferred split descriptor). A deferred split descriptor may also be referred to as an embedded node. The new node written to the data store based on the contents of a deferred split descriptor may be referred to as a "split-result" node herein.

In one embodiment, when a request to insert an entry corresponding to a particular list key LK1 (and a hash key HK1) is received, an index operation handler selected to perform the insert may first identify the particular tree-structured index corresponding to HK1 (assuming such an index already exists), and fetch the root node of that index. Then, a path down the tree to a candidate destination node CN1 for the LK1 entry may be identified. During the traversal of the tree, in some embodiments the index handler may keep track of deferred write operations that may be performed after the primary task of inserting LK1's entry is completed. Such deferred operations, as will become clearer with the help of examples provided below, may include implementing split operations deferred earlier, adjusting child node reference or pointer-related entries at various index nodes, and so on.

In some embodiments, respective split criteria (e.g., the maximum sizes of the index nodes, or the maximum number of keys for which entries can be accommodated at a given node) may be defined for respective levels or depths within the tree-based index: e.g., a root node may meet its split criterion when it has reached R entries, a leaf node may meet its split criterion when it has reached F entries, and a non-leaf, non-root mode at depth D within the tree may meet its split criterion when it has reached M entries, etc. The split criteria for the various levels may be selected in different embodiments, for example, based on parameters such as the average size of packets transmitted between the index handlers and the storage service versus the average sizes of the keys, etc. In some embodiments all the nodes may have the same split criterion, regardless of the particular depth (distance from the root) of a node within the tree. In at least one embodiment, split criteria may be defined at least partly in terms of node "heat"—e.g., the number or rate of recent writes to the node. In one implementation, for example, timestamps corresponding to the N most recent writes to a given node may be stored in the node, and the node may be deemed to have met its split criterion if the number of writes to it within a specified period T exceed a threshold. Using the heat-based approach may result in better workload distribution at the storage servers at which the index nodes are stored. A combination of factors may contribute to split criteria in some embodiments—e.g., a compound metric based on the number of keys currently in a node, the total size of the entries in the node, and/or timing or "heat" information may be compared to a threshold to determine whether a node should be split.

After the candidate destination node CN1 is reached, the index handler may determine the contents of a critical write which has to be performed before an insert-completed response (indicating the success of the index insert for LK) can be provided. The contents of the critical write may differ, depending on various factors such as (a) whether CN1 already contains one or more embedded deferred split descriptors, (b) whether LK1 falls within the key range of an embedded deferred split descriptor currently in CN1 and/or (c) whether adding LK1's entry would lead CN1 to meeting its split criterion.

In one straightforward scenario, CN1 may not contain a deferred split descriptor (generated as a result of an earlier insert for a different key) and adding a new entry (for LK1) to CN1 would not lead to a split criterion for CN1 being met. In this scenario, the critical write would comprise adding LK's entry and writing the modified CN1 to the data store using a conditional write (with the expected condition being that CN1 has not been modified since it was read by the index handler responsible for inserting LK1's entry).

In another scenario, CN1 may not contain a deferred split descriptor, but adding LK1's entry may lead CN1 to meet its split criterion. In this case, one or more deferred split descriptors may be embedded within CN1 (depending on CN1's depth within the tree as discussed below). A given deferred split descriptor may include, in at least some embodiments, a new node identifier generated or determined by the index handler for a to-be-split node, and one or more pre-existing list key entries of CN1 (and in some cases the entry for LK1). The critical write in this scenario would comprise the modified version of CN1 with the embedded deferred split descriptor(s), and would once again be attempted using the conditional write feature of the back-end data store.

In a third scenario, CN1 may already contain one or more deferred split descriptors. If LK1 falls within the key range of a deferred split descriptor DSD1, the critical write may comprise writing the node identified in DSD1 (with LK1's entry added) to the back-end data store via a conditional write. If LK1 falls outside the key range of any DSD, the critical write may comprise adding LK1's entry to the set of entries of CN1 and writing the modified CN1 node via a conditional write.

If the conditional write request corresponding to the critical write (whatever the contents of the critical write happen to be) succeeds, in various embodiments an insert-completed response may be provided without waiting for any other operations to be completed. No locks may be acquired for the critical write or for any other write in at least some embodiments. Even when the result of adding the LK1 entry results in a split criterion being met, the actual split may not be performed before the insert-completed response is generated in at least some embodiments. Instead, in such embodiments, while the identifier of the new to-be-split node may be generated and stored within a DSD in the modified version of the candidate node, the write of the to-be-split node may be deferred until later (e.g., until another index handler or the same index handler encounters the deferred split descriptor while processing some other index operation request). If the conditional write operation fails, in some embodiments a failure indication may be provided instead of the insert-completed indication.

In addition to the critical write corresponding to the insert of LK1, in at least some embodiments the index handler may also have identified zero or more deferred write operations to perform during its traversal of the tree. Such deferred writes may be designated as non-critical writes (with respect to completing LK1's insertion) and may, for example, involve performing an actual split corresponding to a deferred split descriptor stored earlier, correcting child node references and so on. A non-critical write may be directed to a node other than the node written as part of the critical write—that is, the same node may not be updated twice in response to a given insert request in at least some embodiments. Non-critical writes may be referred to as "fix-up" operations for the index or tree in some embodiments. In one embodiment, the tree-structured data structure used for the index may be referred to as a "fix-up" tree. Depending on the number of deferred or non-critical operations identified, the index handler may issue zero or more conditional-write requests corresponding to individual non-critical writes. In some implementations, a given index handler may comprise multiple threads of execution, with one thread issuing the conditional write request for the critical write, and other threads issuing conditional write requests for non-critical writes. The failure of a non-critical write may result in no further action by the index handler in at least some embodiment, under the general assumption that such a failed non-critical write would be recognized as part of a subsequent traversal of the index for some other index operation. In some embodiments as discussed below, a proportional-effort policy may be implemented by the index handler fleet. According to such a policy, the amount of work (e.g., the total number of conditional writes) performed for a given insert request should in general be kept as close as possible to the average amount of work performed for all inserts. Thus for example, if on average between one and two non-critical writes (and one critical write) are performed for a given insert request, then an index handler should typically avoid scheduling more than two non-critical writes regardless of the number of deferred operations it identifies during the index traversal, and the index handler should typically schedule at least one non-critical write (if it encounters non-critical writes).

According to the approach discussed above, at least in some embodiments it may often be the case that a deferred split descriptor is generated and stored by one index handler (in response to one insert request), while the write resulting in the persistence of the new node indicated in the split descriptor to the data store is performed by a different index handler (e.g., during the processing of a different insert request). Before an insert-completed response is provided for a list key, a critical write containing the entry for the list key may have to be successfully completed as described. Consequently, even though the tree being used for the index may not necessarily be perfectly balanced at some points in time due to the presence of deferred split descriptors, and even though some child pointers/references of the index may be temporarily inaccurate, the index may support immediate consistency. That is, at any point in time after an insert corresponding to a given list key succeeds, a persistent version of the node containing the entry for that list key may be retrieved reliably (using the combination of the hash and list keys) from the back-end data store in various embodiments. In at least some embodiments, a write to the back-end data store may not be considered successful until multiple replicas of the object being written have been replicated at respective storage servers (for example, to one "master" storage server for the object and one or more non-master storage servers).

In some embodiments, variations of the basic scheme outlined above may be used. For example, the underlying data (e.g., the order details in the order management example) for which the index is created may be stored within the index nodes themselves in some embodiments—that is, an entry for a list key LK1 may include the content of the record identified by LK1. In at least one embodiment, the algorithm may be used for indexes that are implemented entirely within volatile or main memory—e.g., persistent disk-based storage devices may not be employed.

As in other types of indexing algorithms, the list key index for a given hash key may be structured in such a way that responding to a range query based on list keys is very efficient. For example, in the order management example, a response to a query logically equivalent to "list orders submitted by customer C1 within order identifier range [OIDp-OIDq]" may be generated by (a) identifying the particular list key index corresponding to customer C1, (b) navigating the index down to the leaf node LN1 containing an entry for OIDp and (c) reading, using the entries contained in LN1 and zero or more successor leaf nodes, order records corresponding to the entries for OIDp-OIDq. In at least one embodiment, requests to delete a list key entry may be implemented by simply zeroing out the entry contents, instead of actually deleting the entry from the index.

Figure 7:
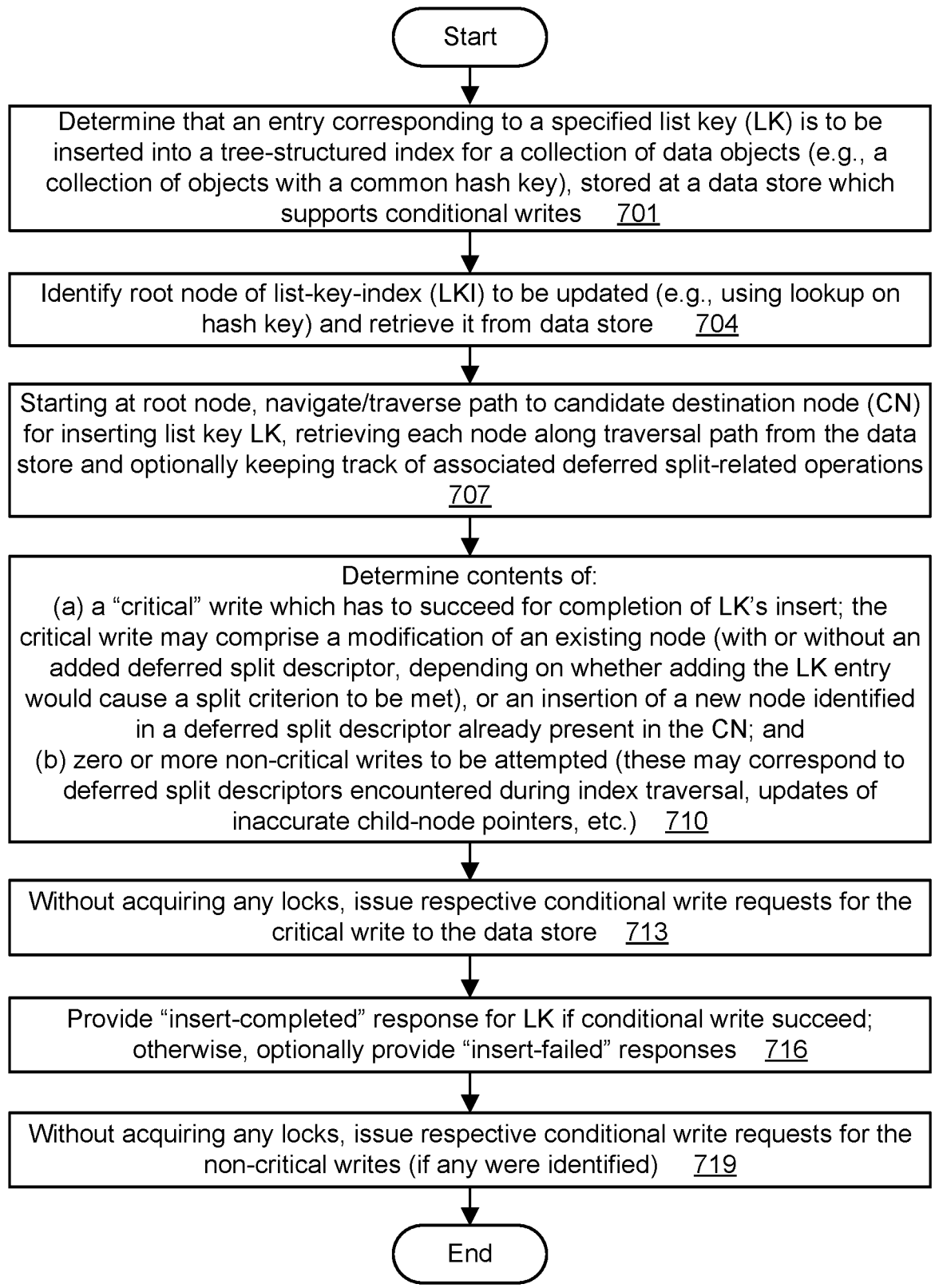
FIG. 7 is a flow diagram illustrating aspects of operations that may be performed to insert an index item according to a lock-free indexing algorithm in which split-related operations may be deferred, according to at least some embodiments.

FIG. 7 is a flow diagram illustrating aspects of operations that may be performed to insert an index item according to a lock-free indexing algorithm in which split-related operations may be deferred, according to at least some embodiments. As shown in element 701, a determination may be made (e.g., by an index handler of a storage service in response to a client-generated request) that an index entry corresponding to a list key LK is to be inserted into a tree-based index set up for a collection of data objects (e.g., the collection of data objects associated with a single hash key). The nodes of the index, as well as the data objects, may be stored at a back-end data store which supports conditional writes in the depicted embodiment. The root node of the list key index (LKI) to be updated may be identified (e.g., based on a lookup via the common hash key for the collection of data objects) and retrieved from a back-end data store (element 704).

Starting at the root node, the tree may be traversed to a candidate destination node (CN) for the insertion of LK's entry (element 707). Each node along the path may be retrieved from the data store in at least some implementations. In some embodiments, the index handler responsible for the insertion may record one or more opportunities for deferred operations as it traverses the index, such as deferred splits of nodes, correcting child node references, and the like.

Once the candidate destination node CN is reached, the index handler may determine the contents of a critical write and zero or more non-critical writes that the index handler will initiate (element 710). Depending on the state of CN (e.g., how close CN is to its maximum capacity for entries, whether CN already has a deferred split descriptor embedded in it, etc.) and where LK lies among the range of values of list keys associated with CN, the critical write may either involve the update of CN, or the write of a new node (split from CN) to the back-end data store. The non-critical writes may comprise operations identified during the traversal to CN, or may be side effects of the critical write itself (e.g., a parent node's child reference, which may contain a key range for the child node in the depicted embodiment, may be updated due to the insertion of LK's entry).

A conditional write request for the critical write may be transmitted to the back-end data store (element 713) without acquiring any locks in the depicted embodiment. If the critical write succeeds, an insert-completed response may be provided to the source of the insert request (element 716). If the critical write fails, in some embodiments a corresponding insert-failed response may be provided instead. If one or more non-critical writes were identified, they may also be initiated using respective conditional write requests in at least some embodiments (element 719).

Figure 8:
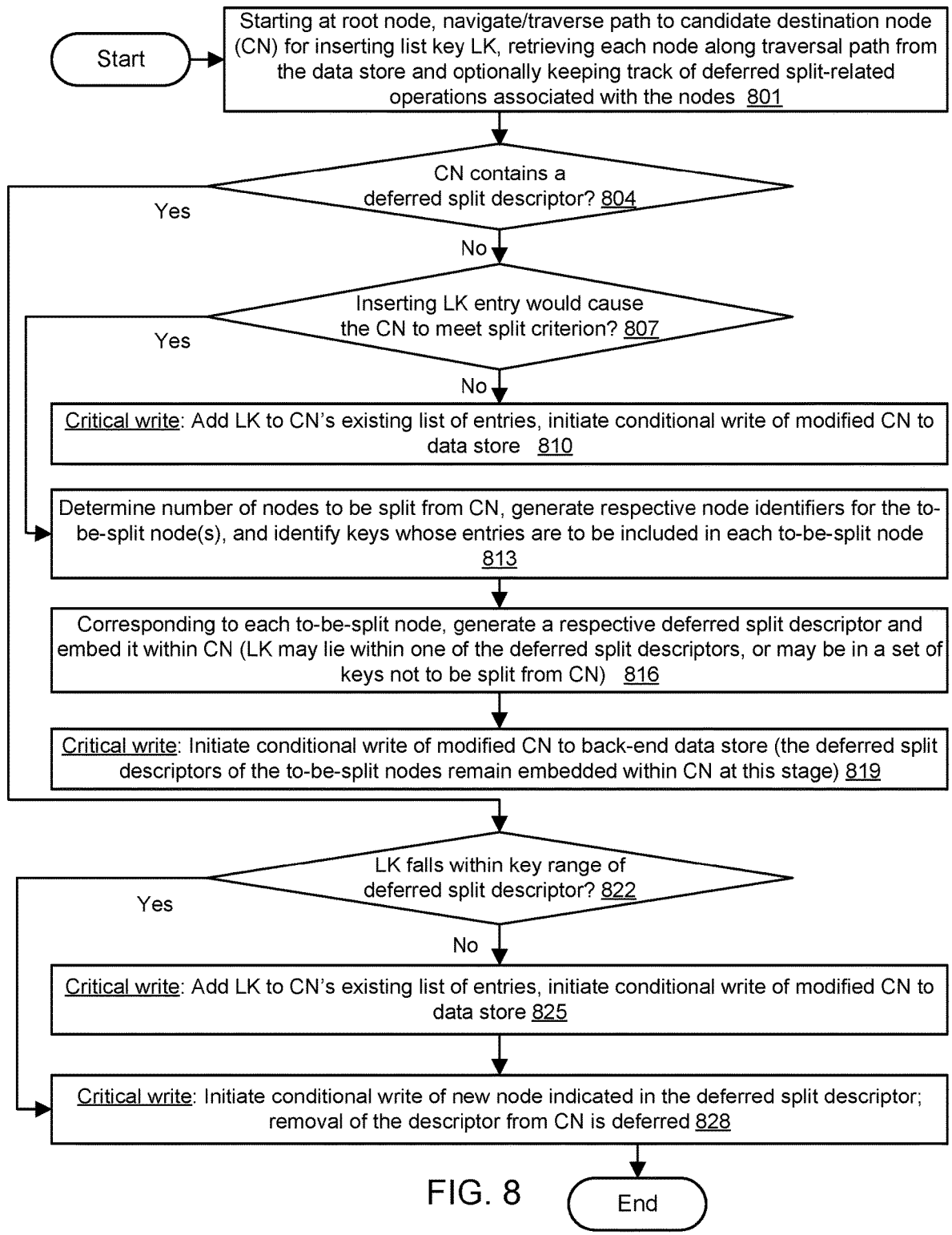
FIG. 8 is a flow diagram illustrating aspects of operations that may be performed to implement critical writes associated with inserting an index entry, according to at least some embodiments.

FIG. 8 is a flow diagram illustrating aspects of operations that may be performed to implement critical writes associated with inserting an index entry, according to at least some embodiments. As shown in element 801, the tree used for the index may be traversed starting from the root node along a path to a candidate destination node CN for the to-be-inserted list key LK, with each non-root node being identified using child node references. During the traversal, the index handler responsible for the insert may keep track of deferred split related operations associated with the nodes encountered—e.g., some nodes may have deferred split descriptors in them, others may have not-fully-accurate child node references, and so on.

When the candidate destination node CN (which may in some cases be the root node itself) is reached, the index handler may determine whether CN already has a deferred split descriptor (DSD) (element 804). If CN does not contain a DSD, and adding LK's entry would not cause CN to meet its split criterion (as determined in operations corresponding to element 807), a modified version of CN that includes a new entry for LK may be created. A conditional write may be initiated to store this modified version of CN to the back-end data store (element 810); the critical write in this scenario may comprise the write of this modified version of CN.

If the addition of LK's entry would cause CN to meet its split criterion (which may depend on the depth of CN within the tree as discussed earlier), as also determined in operations corresponding to element 807, the index handler may have to prepare one or more deferred split descriptors and embed them into CN, and then store the modified version of CN containing the deferred split descriptor(s) to the back-end data store as the critical write. As indicated in element 813, the number of new nodes to (eventually) be split from CN may be determined, e.g., based on whether CN is the root node (in which case two nodes may be split from CN) or not (in which case one node may be split). A respective node identifier may be generated for each to-be-split node, and the set of keys for which entries are to be included in each to-be-split node may be identified. A respective deferred split descriptor corresponding to each to-be-split node may be included or embedded in a modified version of CN (element 816). Each DSD may include the identifier generated for the to-be-split node, as well as the keys whose entries are to be included in the to-be-split node. The entry for LK itself may be included in a DSD if it lies within the range associated with the DSD; otherwise, if LK is outside the range of keys of any of the DSDs, it may be added to CN's set of key entries. After the DSD or DSDs have been embedded into CN, the critical write of the modified version of CN may be initiated to the back-end data store (element 819), e.g., using a conditional write primitive supported by the back-end data store.

If CN does contain at least one embedded DSD (as determined in operations corresponding to element 804), this means that CN has already met its split criterion prior to the current insert operation. The contents of the critical write may then depend on whether LK lies within the range of keys of an embedded DSD, or not.

If LK lies within the range of an embedded DSD (as detected in operations corresponding to element 822), the critical write may comprise the write of the to-be-split node indicated in the DSD (element 828). That is, the split that was deferred earlier may constitute the critical write. The node that is written to the data store, with an identifier and a set of contents based on the DSD, may be referred to as the split-result node. Even though the node indicated in the DSD is written to the back-end data store as part of the insert processing, the DSD itself may remain embedded in CN in at least some embodiments; the removal of the DSD may be deferred (e.g., at least until after the split-result node is written out to the back-end data store as the critical write).

If LK lies outside the range of an embedded DSD (as also detected in operations corresponding to element 822), LK's entry may simply be added to CN in at least some embodiments, leaving the DSD unchanged. The critical write may then comprise the write of the modified CN with the LK entry added (element 825). In this scenario, CN may grow despite the presence of the DSD. As such, buffer space sufficient to store at least one key entry after a node such as CN meets its split criterion (and after a DSD is embedded in the node) may be retained at each node in at least some embodiments. The write of the to-be-split node indicated in the DSD may be attempted as a non-critical write after the critical write of element 825 is attempted.

It is noted that at least in some embodiments, exactly one critical write (corresponding to one node of the index) may need to be performed to complete an insert of a list key's entry. In some embodiments, if a conditional write request corresponding to the critical write fails due to the fact that an entry with the same node identifier has been modified since it was read, at least some of the other non-critical writes may still be attempted by the index handler using respective conditional writes. In one embodiment, if the index handler determines that it is going to attempt multiple non-critical writes the index handler may issue respective conditional write requests for each of the multiple non-critical writes regardless of the success or failure of any of the non-critical writes. In other embodiments, a failure of one of the write requests issued (e.g., either the critical write or a non-critical write) may cause the index handler to avoid issuing any additional write requests. In at least some embodiments, the approach taken with respect to non-critical writes in the indexing algorithm is that because (a) such writes are not essential for maintaining immediate consistency and (b) such writes would be identified and acted on by other index handlers (or the same index handler which attempted them in the first place) later, the failure of a non-critical write may be ignored.

Illustrative Computer System

In at least some embodiments, a computer system that implements a portion or all of one or more of the technologies described herein may include a computer system that includes or is configured to access one or more computer-readable media. FIG. 9 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 9 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
  a plurality of key-value data stores comprising a first key-value data store and a second key-value data store, wherein the first key-value data store is independent of the second key-value data store such that the first key-value data store is configured to remain available during a failure of the second key-value data store, and wherein the second key-value data store is independent of the first key-value data store such that the second key-value data store is configured to remain available during a failure of the first key-value data store; and
  one or more processors and one or more memories to store computer-executable instructions that, if executed, cause the one or more processors to:
    receive a request to create or update a data object using an atomic operation;
    detect an availability of the first key-value data store or the second key-value data store;
    generate a numerical value based at least in part on the detected availability;
    determine a selected key-value data store of the plurality of key-value data stores for performing the request based at least in part on the numerical value generated based on the detected availability, wherein an identifier associated with the data object indicates the selected key-value data store;
    generate an event in an event log associated with the data object, wherein the event is associated with the identifier;
    generate, using a lock-free indexing algorithm, one or more index entries associated with the data object, wherein the one or more index entries are associated with the identifier; and
    cause the selected key-value data store to store the data object, the event, and the one or more index entries, such that the event and the one or more index entries are consistent with the data object, wherein a current state of the one or more index entries corresponds to a current value of the data object.

2. The system as recited in claim 1, wherein the one or more memories store additional computer-executable instructions that, if executed, cause the one or more processors to:
  detect an unavailability of the selected key-value data store;
  receive an additional request to create an additional data object;
  determine, for the additional request, an additional selected key-value data store of the plurality of key-value data stores excluding the selected key-value data store;
  assign an additional identifier to the additional data object, wherein a portion of the additional identifier indicates the additional selected key-value data store;
  generate an additional event and one or more additional index entries associated with the additional data object, wherein the additional event and the one or more additional index entries are associated with the additional identifier; and cause the additional selected key-value data store to store the additional data object, the additional event, and the additional one or more index entries, such that the additional event and the additional one or more index entries are consistent with the additional data object.

3. The system as recited in claim 1, wherein the one or more memories store additional computer-executable instructions that, if executed, cause the one or more processors to:

receive a query associated with an account;

retrieve first data associated with the account from the first key-value data store;

retrieve second data associated with the account from the second key-value data store; and generate a response to the query comprising a union of the first data and the second data.

4. The system as recited in claim 1, wherein the first key-value data store is accessible via a first set of application programming interfaces (APIs), and wherein the second key-value data store is accessible via a second set of APIs differing at least in part from the first set of APIs.

5. A method, comprising:

receiving a request to create a data object using an atomic operation;

detecting an availability of a key-value data store of a plurality of key-value data stores comprising at least a first key-value data store and a second key-value data store, wherein:

the first key-value data store is independent of the second key-value data store such that the first key-value data store is configured to remain available during a failure of the second key-value data store, and the second key-value data store is independent of the first key-value data store such that the second key-value data store is configured to remain available during a failure of the first key-value data store;

generating a numerical value based at least in part on the detected availability;

determining a selected key-value data store of the plurality of key-value data stores for performing the request based at least in part on the numerical value generated based on the detected availability, wherein an identifier assigned to the data object indicates the selected key-value data store;

generating an event descriptive of creation of the data object, wherein the event is associated with the identifier;

generating, using a lock-free indexing algorithm, one or more index entries associated with the data object, wherein the one or more index entries are associated with the identifier; and causing the selected key-value data store to store the data object and the event, wherein the event is consistent with the data object, wherein a current state of the one or more index entries corresponds to a current value of the data object.

6. The method as recited in claim 5, further comprising:

detecting an unavailability of the selected key-value data store;

receiving an additional request to create an additional data object;

determining, for the additional request, an additional selected key-value data store of the plurality of key-value data stores excluding the selected key-value data store, wherein an additional identifier assigned to the additional data object indicates the additional selected key-value data store;

generating an additional event descriptive of creation of the additional data object, wherein the additional event is associated with the additional identifier; and causing the additional selected key-value data store to store the additional data object and the additional event, wherein the additional event is consistent with the additional data object.

7. The method as recited in claim 5, further comprising:

receiving a query associated with an account;

retrieving first data associated with the account from the first key-value data store;

retrieving second data associated with the account from the second key-value data store; and generating a response to the query comprising a union of the first data and the second data.

8. The method as recited in claim 5, wherein the method further comprises:

detecting a lowered availability of the selected key-value data store;

generating a new numerical value based at least in part on the lowered availability;

receiving an additional request to create an additional data object;

determining, for the additional request, an additional selected key-value data store of the plurality of key-value data stores based at least in part on the new numerical value.

9. The method as recited in claim 5, wherein the first key-value data store is accessible via a first set of application programming interfaces (APIs), and wherein the second key-value data store is accessible via a second set of APIs differing at least in part from the first set of APIs.

10. The method as recited in claim 5, further comprising:

receiving an additional request to store an update to the data object, wherein the update is associated with the identifier;

generating an additional event descriptive of the update to the data object, wherein the additional event is associated with the identifier; and causing the selected key-value data store to store the update to the data object and the additional event, wherein the additional event is consistent with the update to the data object.

11. The method as recited in claim 5, wherein the first key-value data store is configured to remain available for writes of new data objects during a failure of the second key-value data store, and wherein the second key-value data store is is configured to remain available for writes of new data objects during a failure of the first key-value data store.

12. The method as recited in claim 5, further comprising:

causing the selected key-value data store to store the one or more index entries.

13. One or more non-transitory computer-readable storage media storing program instructions that, when executed on or across one or more processors, perform:

receiving a request to create a data object using an atomic operation;

detecting an availability of a key-value data store of a plurality of key-value data stores, wherein plurality of key-value data stores comprises at least a first-key value data store and a second key-value data store, wherein:

the first key-value data store is independent of the second key-value data store such that the first key-value data store is configured to remain available during a failure of the second key-value data store, and the second key-value data store is independent of the first key-value data store such that the second key-value data store is configured to remain available during a failure of the key-value first data store;

generating a numerical value based at least in part on the detected availability of the key-value data store;

determining a selected key-value data store of a plurality of data stores based at least in part on the numerical value generated based on the detected availability, wherein an identifier assigned to the data object indicates the selected key-value data store;

generating a log entry descriptive of creation of the data object, wherein the log entry is associated with the identifier; and generating one or more index entries associated with the data object, wherein the one or more index entries are associated with the identifier; and causing the selected key-value data store to store the data object and the log entry such that the log entry is consistent with the data object, wherein a current state of the one or more index entries corresponds to a current value of the data object.

14. The one or more non-transitory computer-readable storage media as recited in claim 13, further comprising additional program instructions that, when executed on or across the one or more processors, perform:

detecting an unavailability of the selected key-value data store;

receiving an additional request to create an additional data object;

determining, for the additional request, an additional selected key-value data store of the plurality of key-value data stores excluding the selected key-value data store, wherein an additional identifier assigned to the additional data object indicates the additional selected key-value data store;

generating an additional log entry descriptive of creation of the additional data object, wherein the additional log entry is associated with the additional identifier; and causing the additional selected key-value data store to store the additional data object and the additional log entry such that the additional log entry is consistent with the additional data object.

15. The one or more non-transitory computer-readable storage media as recited in claim 13, further comprising additional program instructions that, when executed on or across the one or more processors, perform:

receiving a query associated with an account;

retrieving first data associated with the account from the first key-value data store;

retrieving second data associated with the account from the second key-value data store; and generating a response to the query comprising a union of the first data and the second data.

16. The one or more non-transitory computer-readable storage media as recited in claim 13, wherein the one or more non-transitory computer-readable storage media further comprise additional program instructions that, when executed on or across the one or more processors, perform:

detecting a lowered availability of the selected key-value data store;

generating a new numerical value based at least in part on the lowered availability;

receiving an additional request to create an additional data object;

determining, for the additional request, an additional selected key-value data store of the plurality of key-value data stores based at least in part on the new numerical value.

17. The one or more non-transitory computer-readable storage media as recited in claim 13, further comprising additional program instructions that, when executed on or across the one or more processors, perform:

receiving an additional request to store an update to the data object, wherein the update is associated with the identifier;

generating an additional log entry descriptive of the update to the data object, wherein the additional log entry is associated with the identifier; and causing the selected key-value data store to store the update to the data object and the additional log entry such that the additional log entry is consistent with the update to the data object.

18. The one or more non-transitory computer-readable storage media as recited in claim 13, wherein the first key-value data store is hosted in a first geographical region, and wherein the second key-value data store is hosted in a second geographical region.

19. The one or more non-transitory computer-readable storage media as recited in claim 13, wherein the first key-value data store is configured to remain available for writes of new data objects during a failure of the second key-value data store, and wherein the second key-value data store is configured to remain available for writes of new data objects during a failure of the first key-value data store.

20. The one or more non-transitory computer-readable storage media as recited in claim 13, further comprising additional program instructions that, when executed on or across the one or more processors, perform:

causing the selected key-value data store to store the one or more index entries.

* * * * *